Patented Jan. 2, 1951

2,536,047

UNITED STATES PATENT OFFICE 2,536,047

ALKALINE DIGESTION OF COTTONSEED HULL BRAN

Jefferson L. Eskridge, Long Island City, N. Y.

No Drawing. Application July 27, 1945,
Serial No. 607,485

7 Claims. (Cl. 92—13)

1

The present application is a continuation-in-part of a copending application 398,411, filed June 17, 1941, now abandoned, and relates to the production of a plastic filler from cotton seed hull bran. Said prior case is now abandoned.

Cotton seed hull bran is the seed coat of the cotton seed, from which substantially all staple fibre, linters, hull fibre and cotton-like fuzz have been removed. The material contains large amounts of pentosans, together with hemi-cellulose, lignin, and small amounts of alpha cellulose, soluble carbohydrates, beta cellulose and other components. This material would be itself impractical to use as a raw material for making alpha cellulose. It would not be practical as a filler in most plastics.

This material, I have found, can serve as a raw material for the manufacture of a filler for plastics. By the expression "filler for plastics," I mean that the said material is to be incorporated with a binder, e. g. a synthetic thermoplastic resin, and molded under heat and pressure to the desired size and shape.

In accordance with the present invention I prefer to digest cotton seed hull bran in a liquor containing (dissolved in water) caustic soda (or a mixture of caustic soda and sodium carbonate) as its main dissolved component, together with small amounts of ammonium oxalate, ammonium hydroxide and potassium carbonate. These latter three components, together, showed amount to about one tenth to one sixth (preferably about one-eighth) of the amount of the caustic soda. Caustic soda solution, even if made from pure caustic soda and pure water, will when exposed to the atmosphere, take up carbon dioxide, to become partly converted into sodium carbonate. Crude caustic soda and caustic soda recovered commercially from pulp liquors, usually contains small to substantial proportions of carbonate. About 5% to about 10% (and preferably between 6% and 9%) of caustic soda (based on the amount of hull bran) is used in the digestive solution, 7.5% gives very good results.

The ammonium oxalate, ammonium hydroxide (figured as 26° Bé. ammonia water which contains about 28.4% $NH_3$) and potassium carbonate are preferably used in the proportion 1:2:3, respectively. These figures are subject to some variation. The water:bran ratio can vary between 6:1 and 12:1. Preferably I use about 8 to 10 parts of water to one of bran, to get the best quality of plastic filler. A "ton," as used herein, means 2,000 lbs.

Without restricting the invention to the de-

2 tails, the following examples are given for more fully explaining the invention.

Example 1

(A) One ton of cotton seed hull bran is placed in a rotary digester and a solution of 150 lbs. caustic soda, 6.25 lbs. 26° Bé. ammonia water, 9⅜ lbs. potassium carbonate and 3⅛ lbs. ammonium oxalate in 10 tons of water, was added. This solution contained about 0.7437% of caustic soda, by weight. The digester was then closed (pressure tight) and the contents heated by super-heated steam led into the jacket, the digester being slowly rotated to agitate the contents.

The contents of the digester were heated to about 300° F. (149° C.), under pressure. Such condition was continued for about 3 hours. Then the steam supply was cut off, the relief valve of the digester was opened somewhat to let the pressure fall to 50 lbs. per square inch, the contents of the digester were blown into a blow pit. The solid matter left (undissolved residue of the bran) was washed and allowed to settle, and collected. The yield (dry basis) was 68%, based on the hull bran (i. e. 32% of the weight had been removed). This solid material was found to be very suitable for being mixed with a synthetic thermoplastic resin and the mixture molded under heat and pressure. The molded products showed good insulating value, good strength, took a good polish and were of satisfactory quality.

In the above formula it will be observed that the sum of the amounts of ammonium oxalate, 26° ammonia water and potassium carbonate is equal to one-eighth of the amount of the caustic soda. This is the preferred proportion, but amounts between one-tenth and one-sixth of the amount of caustic soda can be satisfactorily used. It is noted that said three substances are preferably in the proportion 1:2:3, as here shown.

(B) In another similar run, using the same liquor, the temperature of the cooking was 350° F. (177° C.), and the cooking continued for 2 hours. The yield, calculated on air dry basis, was 75% and the product was found suitable as a filler for plastics.

Example 2

This was similar to Example 1, but the amount of each of the chemicals used in the digestive liquor was only two-thirds of the amounts used in Example 1, (caustic soda about half a per cent, namely approximately 0.4958%, in the liquor). The amount of water was 10 times the amount of the hull bran. Cook carried on for 2 hours under a steam pressure of 95 to 100 lbs. per square inch. The yield on the air dry basis was 80% (i. e. 20% or one fifth of the material had been dissolved out) and the product was suitable as a filter when used with binding agents.

In the present case, I consider the cooking time as starting when the temperature of the digester contents has been brought up to the temperature at which the cooking operation (digesting operation) is to be carried out.

I stated above that the amount of caustic soda in the digestive liquor can vary between 5% and 10%, based on the weight of the hull bran. In Example 1, 7.5% was used. If much more than this is used, especially 10% or more (based on the bran), then the amount of water should be proportionately more than stated in Example 1 and/or the temperature used in the cooking should be lower than in Example 1, and/or the time of cooking should be shortened. The use of excessively strong caustic alkali solution, too high a temperature in the cooking and continuing the cooking too long, all tend to dissolve excessive amounts of the bran, whereby the yield will be lowered, and a poorer product formed.

Attempts to use caustic soda solution alone (of the same strength and under the same conditions as in the above examples) as the cooking liquor on hull bran, gave a product which was unsatisfactory as a plastic filler.

Cotton seed hull bran (the starting material of the present process) has not heretofore been digested with caustic alkali solution of the strength set forth above, so far as I am aware, for similar purposes. Cotton seed hull bran has been used to some extent as cattle fodder, or in fertilizers, or as a packing material, or as a fuel.

The digestive solution used herein is somewhat similar to the digestive solutions used in my copending applications 605,639 and 605,640, both filed July 17, 1945, but in the said copending cases the liquors are more concentrated than in the present application.

I claim:

1. A process of making plastic filler from cotton seed hull bran which comprises digesting said bran from which substantially all cotton fuzz has been removed, in an aqueous liquor containing caustic soda as its largest dissolved component, and containing one part of ammonium oxalate, about two parts ammonium hydroxide calculated as 26° ammonia water, and about three parts of potassium carbonate, the combined amounts of said last named three components being between about one tenth and one sixth of the amount of said caustic soda, the amount of said caustic soda being about 5% to 10% of the amount of said hull bran, and the amount of water in said liquor being between 6 and 12 times the amount of said hull bran, such digestion being conducted at about 300 to 350° F. under superatmospheric pressure, and said digestion being continued until about 20% to not over 32% of the hull bran constituents have been dissolved out.

2. A process of making a plastic filler from cotton seed hull bran from which substantially all cotton fuzz has been removed, which comprises digesting said bran in an alkaline cooking liquor, at about 300° F. to about 350° F., in a closed digester, said liquor initially containing each of the following materials in the amounts stated, for 1 ton cotton seed hull bran
10 tons water
100 lbs. caustic soda
4⅛ lbs. ammonia water calculated as 26° Bé.
6¼ lbs. potassium carbonate
2½ lbs. ammonium oxalate and continuing the digestion until about 20% of the hull bran constituents have been dissolved out.

3. A process which comprises digesting cotton seed hull bran from which substantially all cotton fuzz has been removed, in 6 to 12 times its weight of a caustic soda solution of about 0.4958% to about 0.7437% concentration, said solution also containing ammonium oxalate, 26° ammonia solution and potassium carbonate in the proportion 1:2:3, in amount between one-tenth and one-sixth of the amount of such caustic soda, while under about 95 to 100 lbs. pressure and while at approximately the boiling point of the liquor, until about 20% to not over 32% of the hull bran constituents have been dissolved out, removing the digested hull bran and washing same.

4. A process of making plastic filler from cotton seed hull bran which comprises digesting said bran from which substantially all cotton fuzz has been removed, in an aqueous liquor containing caustic soda as its largest dissolved component, and containing one part of ammonium oxalate, about two parts of ammonium hydroxide of 26° Bé. and about three parts of potassium carbonate, the combined amounts of said last named three components being between about one-tenth and one-sixth of the amount of said caustic soda, the amount of said caustic soda being about 5% to about 10% of the amount of said hull bran, and the amount of said liquor being between 6 and 12 times the amount of said hull bran, and the percentage of the caustic soda in the liquor being between about 0.4958% and about 0.7437%, such digestion being conducted in a closed digester under pressure at a temperature between about 300° F. and about 350° F., and said digestion being continued for about 3 hours to about 2 hours.

5. A process of making a plastic filler from cotton seed hull bran from which substantially all cotton fuzz has been removed, which comprised digesting said bran in an alkaline cooking liquor, at about 300° F. to 350° F., in a closed digester for about 2 hours to about 3 hours, as set forth, said liquor being composed essentially of the following materials in the amounts stated, for 1 ton cotton seed hull bran
10 tons water
150 lbs. caustic soda
6¼ lbs. ammonia water of 26° Bé.
9⅜ lbs. potassium carbonate
3⅛ lbs. ammonium oxalate.

6. A process of making a plastic filler from cotton seed hull bran from which substantially all cotton fuzz has been removed, which comprises digesting said bran in an alkaline cooking liquor, at about 300° F. to 350° F., said liquor containing each of the following materials in the amounts stated, for each ton of the cotton seed hull bran, 6 to 12 tons water
100 to 200 lbs. caustic soda
4⅛ to 8⅓ lbs. ammonia water of 26° Bé.
6¼ to 12½ lbs. potassium carbonate
2½ to 4⅛ lbs. ammonium oxalate in which ranges the lower quantities of chemicals are used with the lower quantities of water and the higher quantities of chemicals are used with the higher quantities of water, the combined amounts of said 26° Bé. ammonia water, potassium carbonate and ammonium oxalate being between about one-tenth and one-sixth of the amount of said caustic soda, and the said liquid containing from about 0.4958% to about 0.7437% of caustic soda, and in said process, the time of cooking with the liquor being inversely proportional to the concentration of the liquor, within the time periods of two to three hours.

7. As a new composition of matter, a solution containing dissolved caustic soda as its active chemical agent, and an inhibiting agent composed of 1 part ammonium oxalate, about 2 parts of ammonia water of 26° Bé. and about 3 parts of potassium carbonate, the amount of the inhibiting agent being $\frac{1}{6}$ to $\frac{1}{10}$ of the amount of caustic soda and the concentration of caustic soda in said liquor being between 0.4958% and 0.7437% based on the entire liquor, such solution being suitable as a digesting agent for cotton seed hull bran.

JEFFERSON L. ESKRIDGE.

REFERENCES CITED

The following references are of record in the file of this patent:

UNITED STATES PATENTS

| Number | Name | Date |
|---|---|---|
| 1,842,649 | Bassett | Jan. 26, 1932 |
| 1,998,344 | Thomas | Apr. 16, 1935 |

FOREIGN PATENTS

| Number | Country | Date |
|---|---|---|
| 347,444 | Great Britain | Apr. 30, 1931 |

OTHER REFERENCES

Industrial and Engineering Chemistry, vol. 33, No. 8, August 1941, pages 980 to 983.

Modern Plastics, October 1945, pages 158, 159, 160, 214, 216 and 218.

Paper Trade Journal, July 12, 1945, pages 42 and 43.